Aug. 28, 1934.     L. E. LA BRIE     1,971,861
BRAKE
Filed March 12, 1928     9 Sheets-Sheet 1
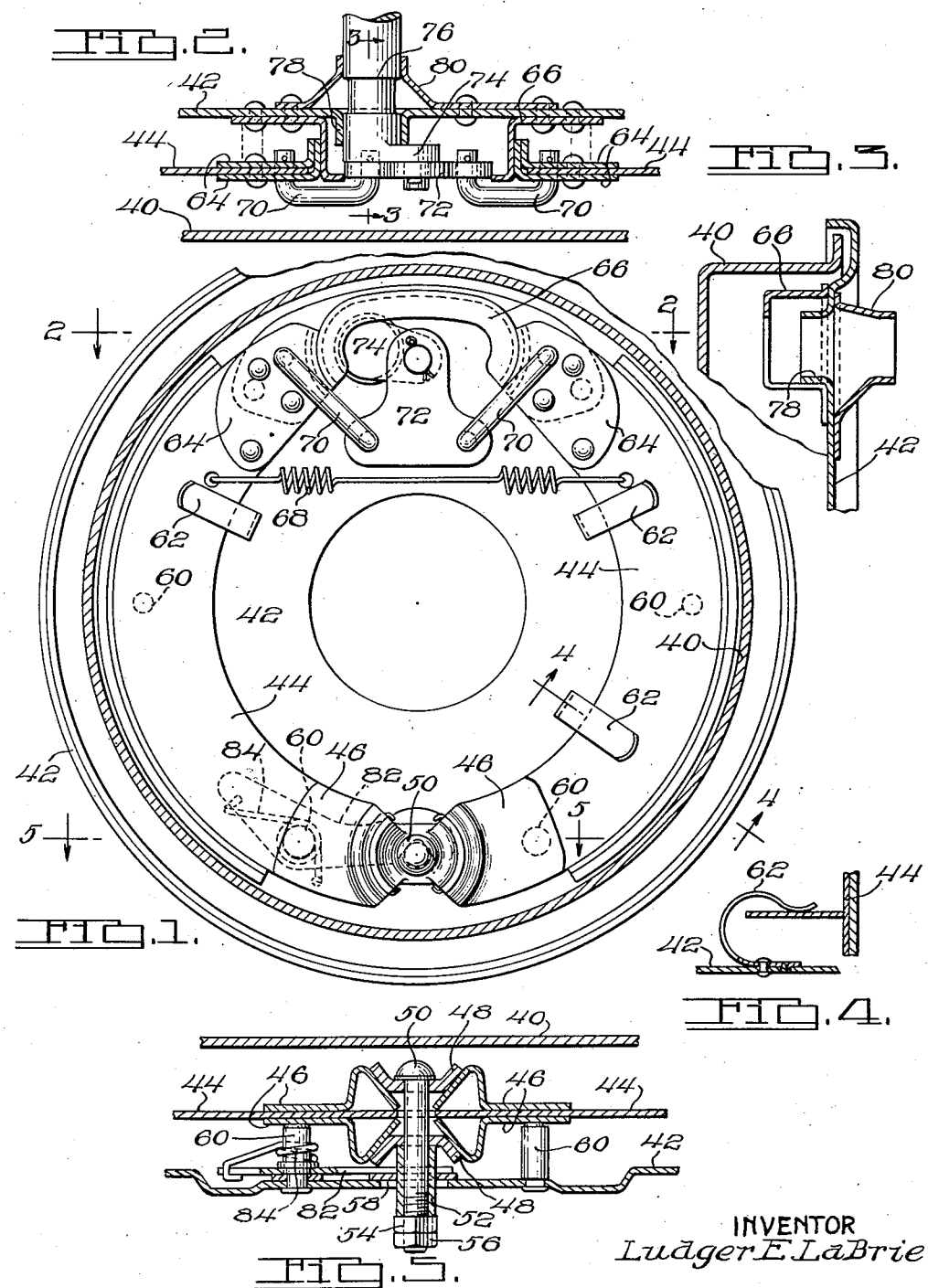
INVENTOR
Ludger E. LaBrie
BY
*[signature]*
ATTORNEY

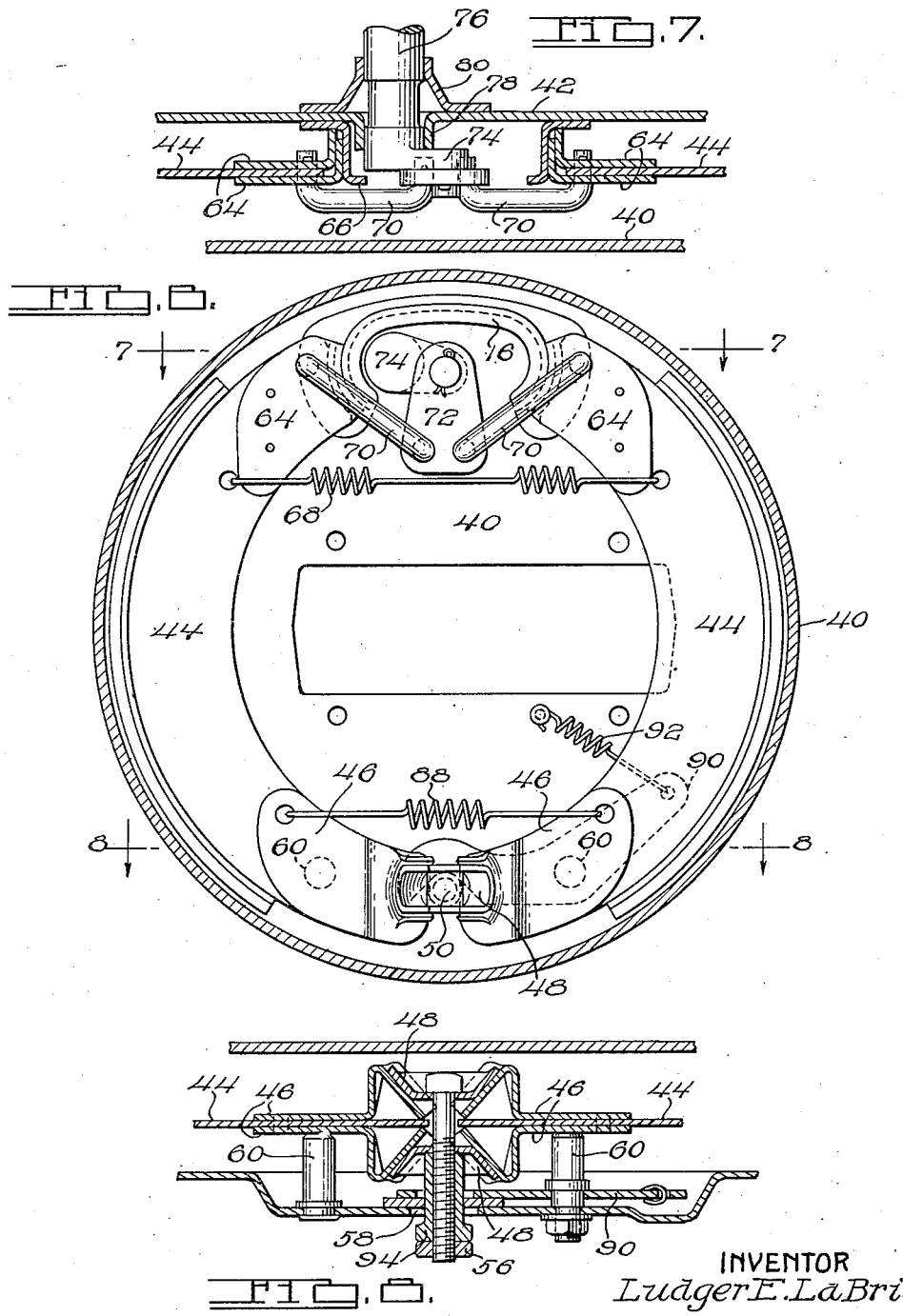

Aug. 28, 1934.  L. E. LA BRIE  1,971,861
BRAKE
Filed March 12, 1928   9 Sheets-Sheet 3
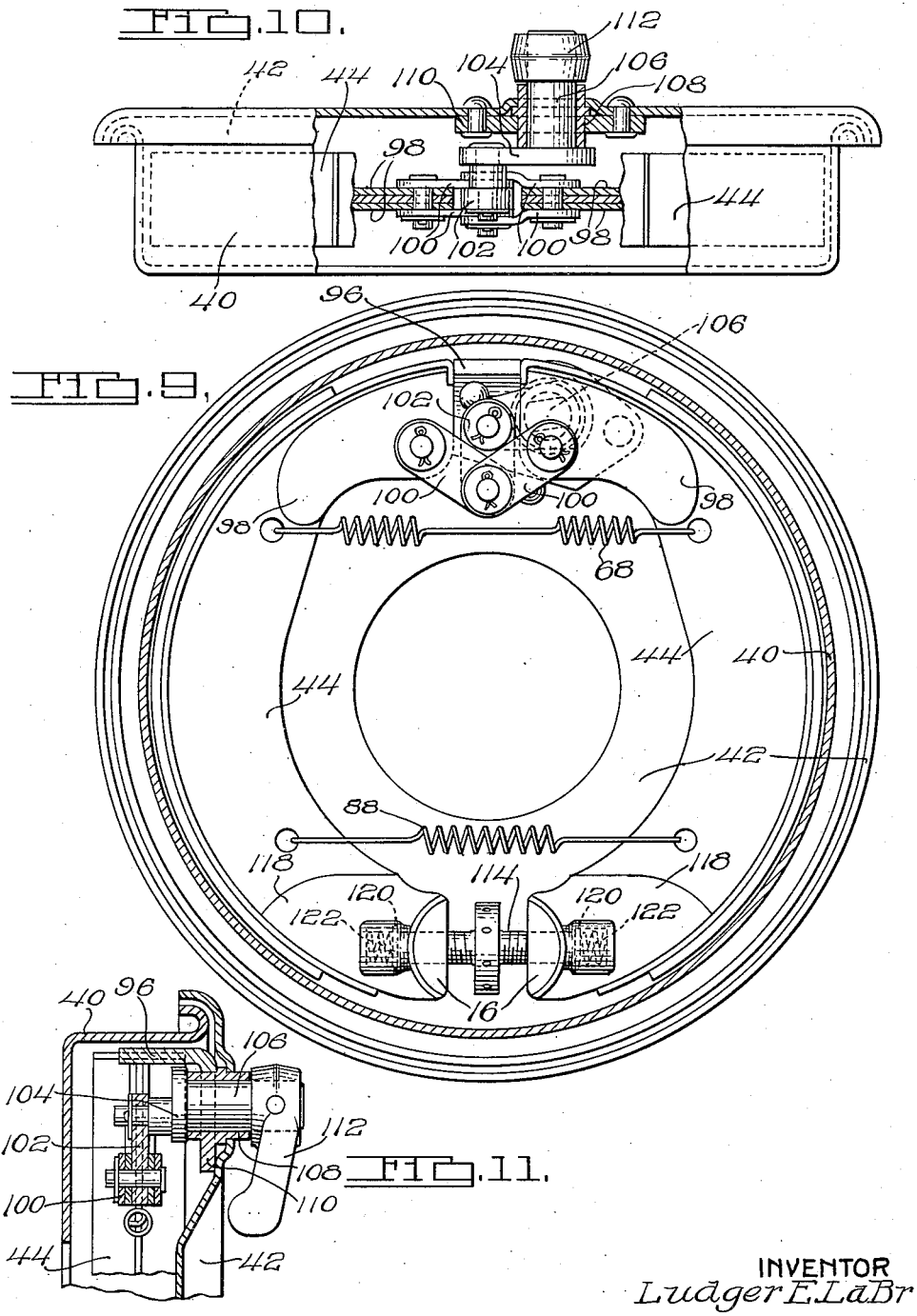

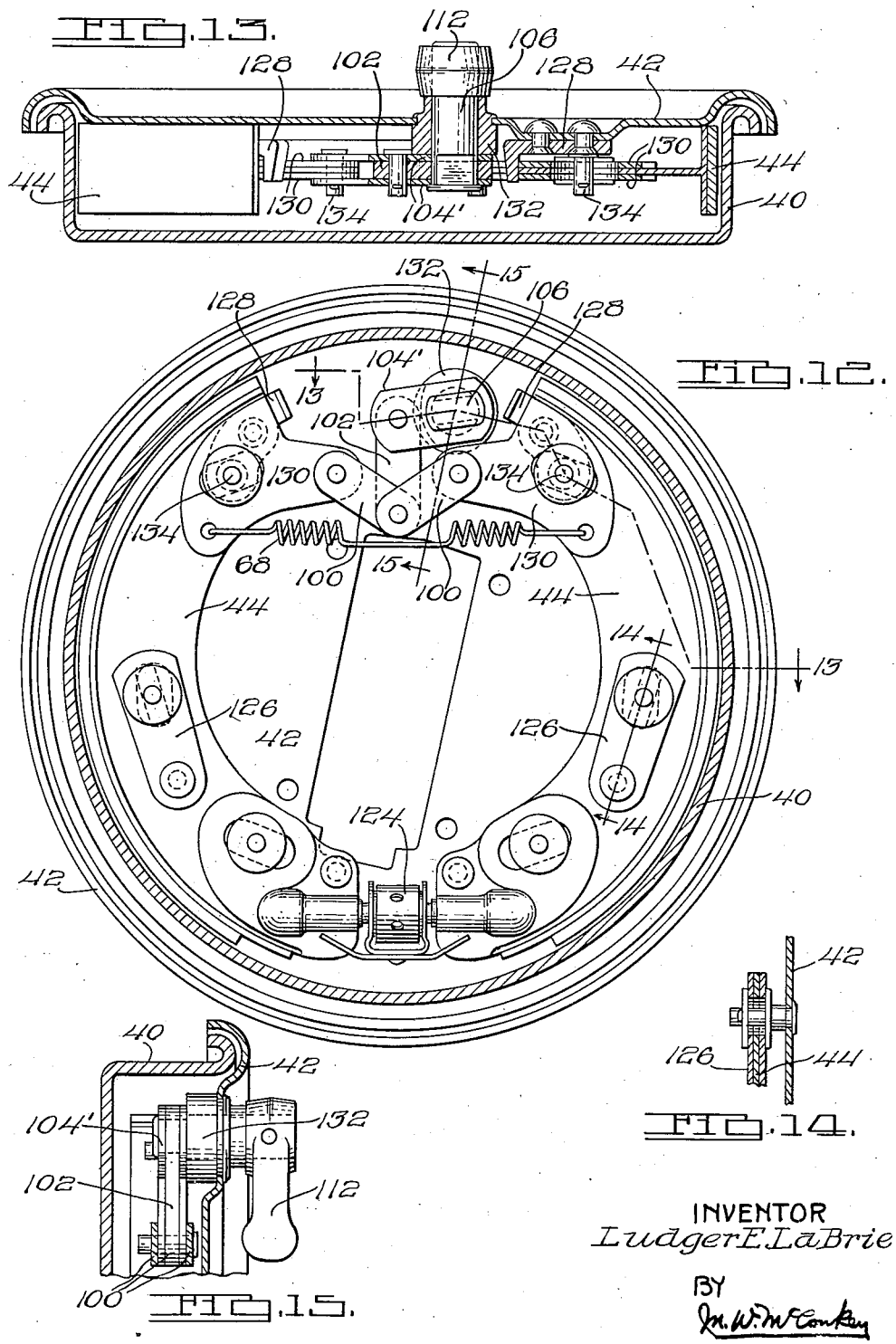

Aug. 28, 1934.  L. E. LA BRIE  1,971,861
BRAKE
Filed March 12, 1928  9 Sheets-Sheet 5

INVENTOR
*Ludger E LaBrie*
BY
*J. W. McConkey*
ATTORNEY

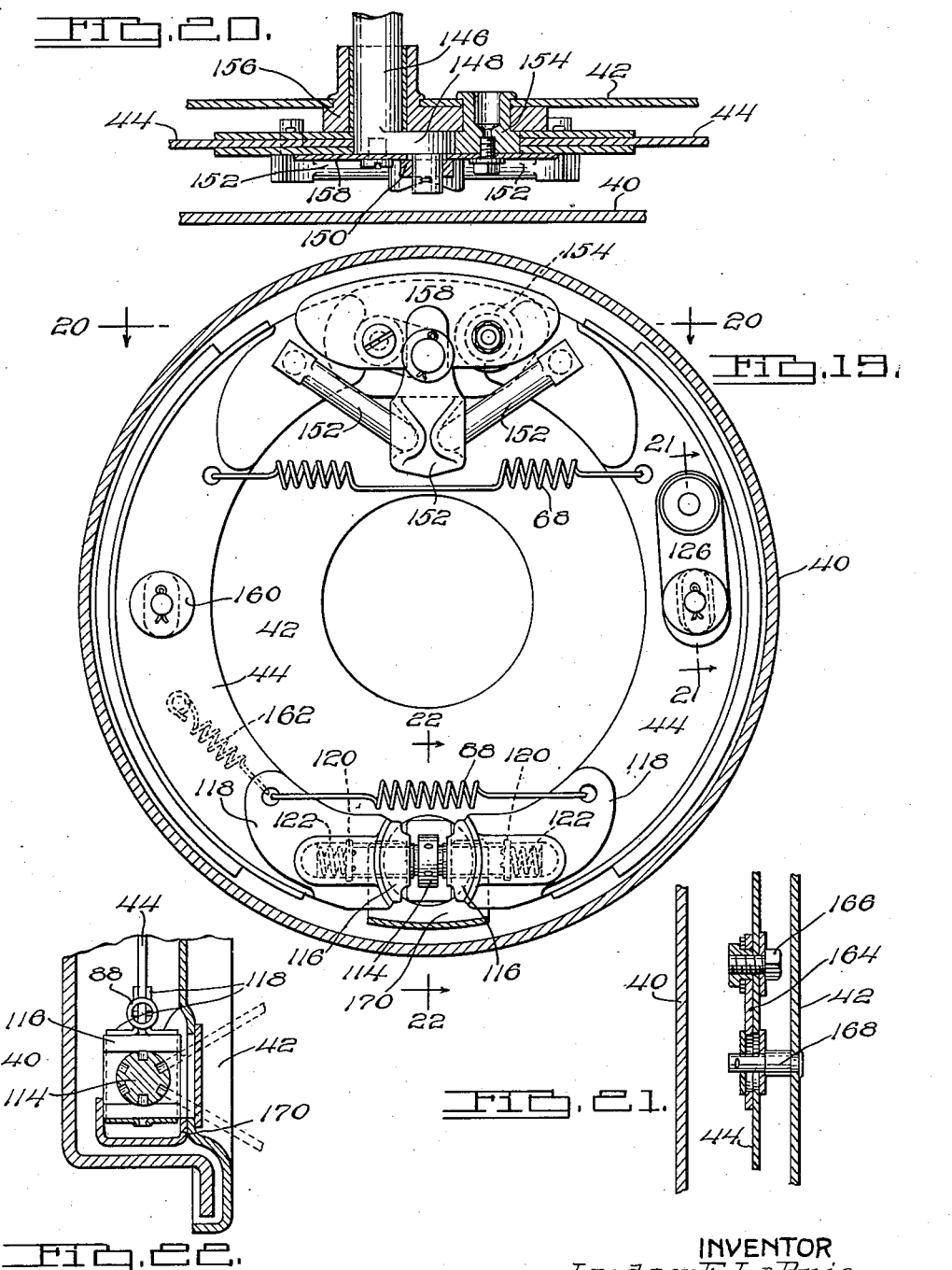

Aug. 28, 1934.  L. E. LA BRIE  1,971,861
BRAKE
Filed March 12, 1928   9 Sheets-Sheet 7
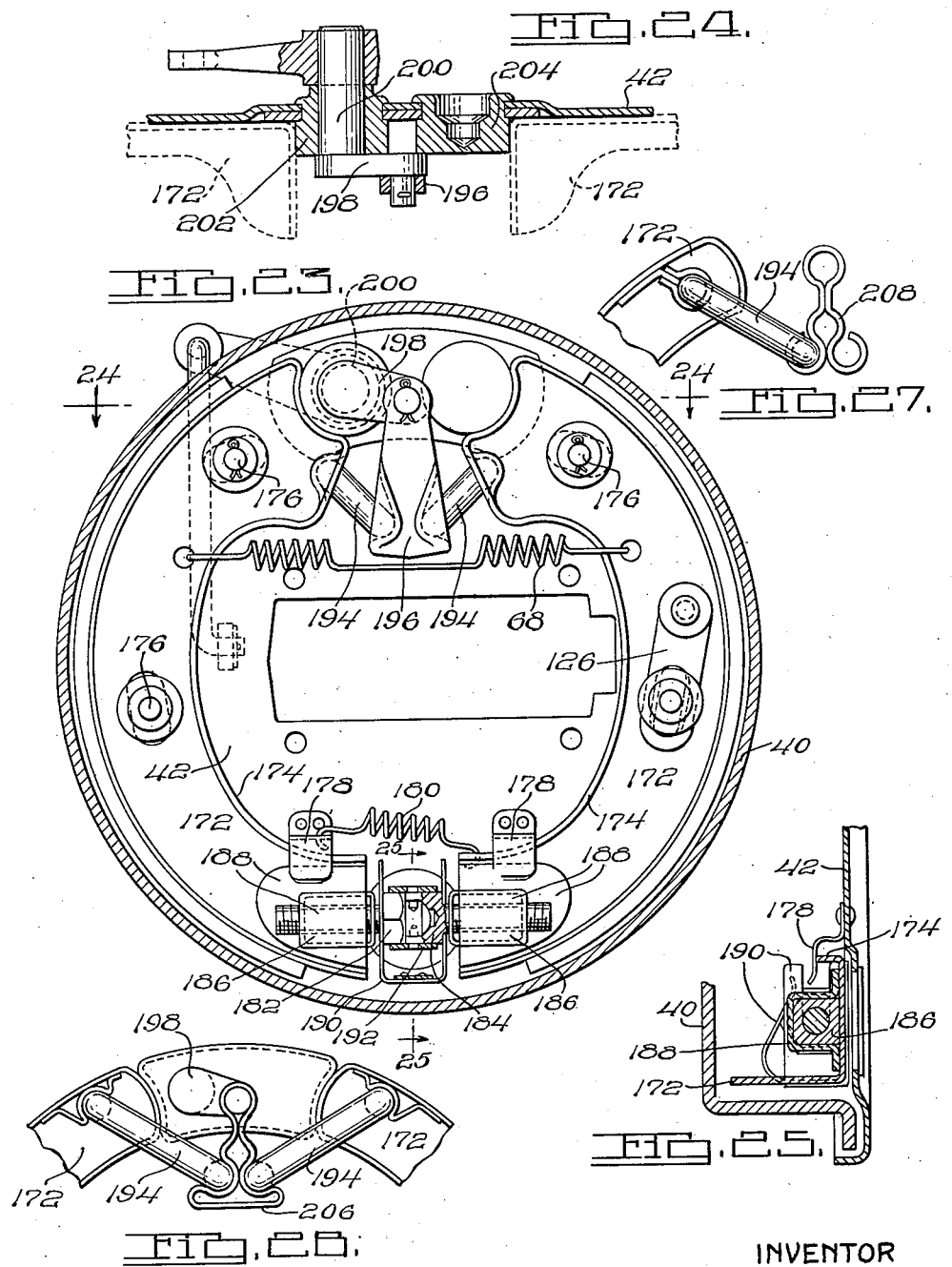
INVENTOR
Ludger E. LaBrie
BY
M. W. McConkey
ATTORNEY

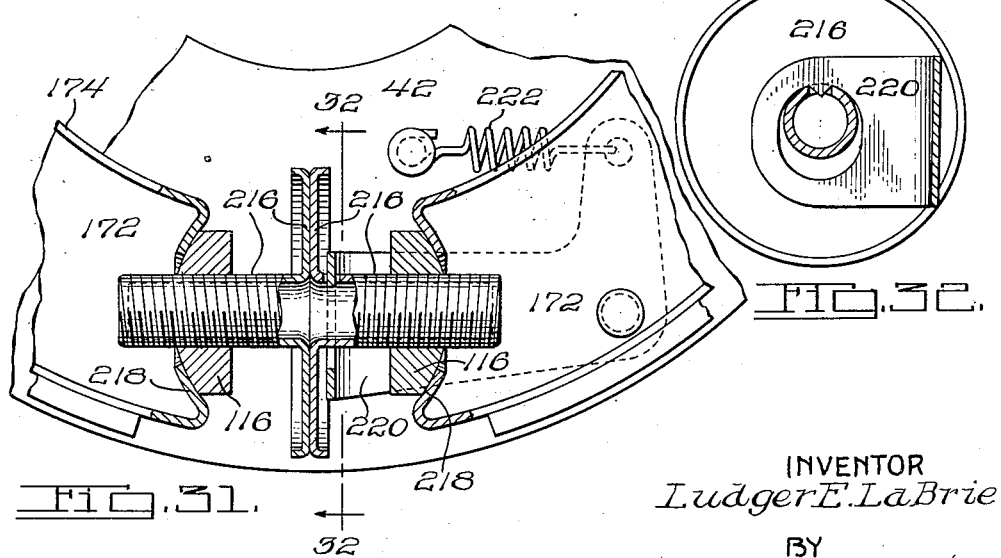

Aug. 28, 1934.  L. E. LA BRIE  1,971,861
BRAKE
Filed March 12, 1928   9 Sheets-Sheet 9
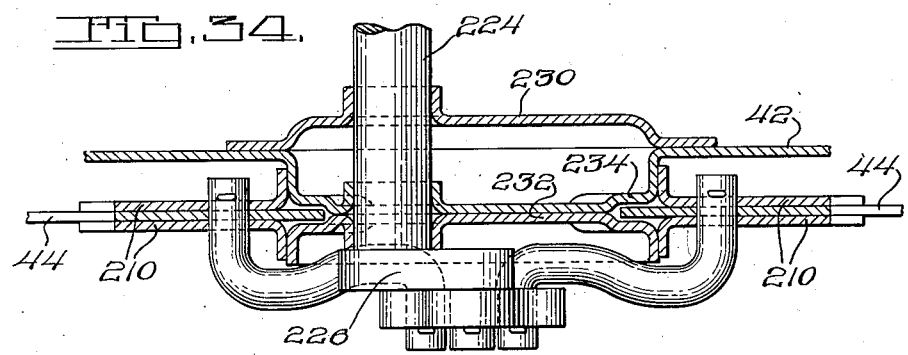
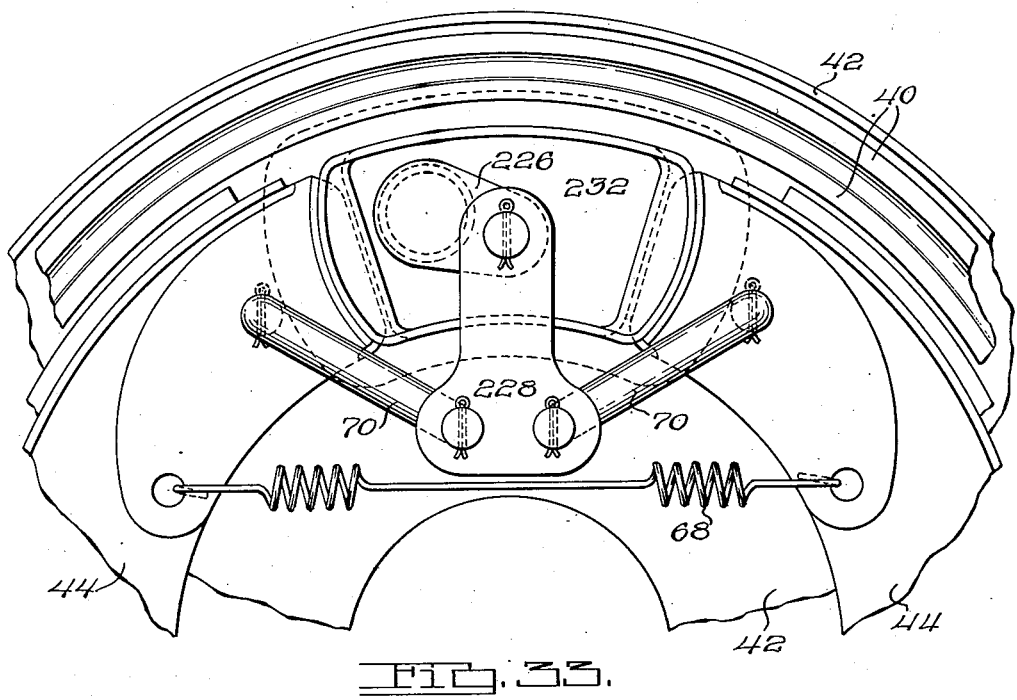
INVENTOR
*Ludger E. LaBrie*
BY
*M. W. McConkey*
ATTORNEY Patented Aug. 28, 1934

1,971,861

UNITED STATES PATENT OFFICE 1,971,861

BRAKE

Ludger E. La Brie, South Bend, Ind., assignor to Bendix Brake Company, South Bend, Ind., a corporation of Illinois Application March 12, 1928, Serial No. 261,068

12 Claims. (Cl. 188—78)

This invention relates to brakes, and is illustrated as embodied, in several forms, in internal expanding automobile brakes. An object of the invention is to provide a simple and inexpensive but powerful brake, preferably of the type in which the anchorage shifts in opposite directions of movement but in which there is no shifting under the load such as might cause undersirable noise or shock.

Having this object in view, the friction means, preferably comprising a set of articulated brake shoes, is lifted bodily by means such as a toggle while both ends of the friction means remain anchored, after which the toggle forces the ends apart to complete the application of the brake while the drum friction holds one or the other of the ends anchored.

Other features of novelty relate to the anchorage of the brake, to details of the toggle mechanism, to novel steady rests and centering means, and to desirable structural details in an adjustable articulating joint connecting the shoes.

The above and other objects and features of the invention will be apparent from the following description of several illustrative embodiments shown in the accompanying drawings, in which:

Figure 1 is a vertical section through the brake, just inside the head of the brake drum, showing the brake shoes in side elevation;

Figure 2 is a partial section through the anchorage and applying means of the brake, on the line 2—2 of Figure 1;

Figure 3 is a partial section through the upper part of the brake, on the line 3—3 of Figure 2, but with the operating shaft removed;

Figure 4 is a partial section through one of the novel steady rests of the brake, on the line 4—4 of Figure 1;

Figure 5 is a partial section through the joint connecting the shoes, on the line 5—5 of Figure 1;

Figure 6 is a vertical section corresponding to Figure 1, but showing a second form of brake;

Figure 7 is a section through the anchorage and applying means, on the line 7—7 of Figure 6;

Figure 8 is a section through the joint connecting the shoes, on the line 8—8 of Figure 6;

Figure 9 is a vertical section corresponding to Figures 1 and 6, but showing a third brake;

Figure 10 is a top plan view, partly broken away, of the brake of Figure 9;

Figure 11 is a partial section through the operating means, on the line 11—11 of Figure 9;

Figure 12 is a vertical section corresponding to Figures 1, 6 and 9, but showing a fourth brake;

Figure 13 is a section through this fourth brake, on the line 13—13 of Figure 12;

Figure 14 is a partial section through one of the shoe-positioning devices, on the line 14—14 of Figure 12;

Figure 15 is a partial section through the applying means, on the line 15—15 of Figure 12;

Figure 19 is a vertical section, corresponding to Figures 1 and 6, but showing a seventh brake;

Figure 20 is a section through the anchorage and the applying means, on the line 20—20 of Figure 19;

Figure 21 is a partial section through one of the shoe-positioning devices, on the line 21—21 of Figure 19;

Figure 22 is a partial section through the joint between the shoes, on the line 22—22 of Figure 19;

Figure 23 is a vertical section, corresponding to Figures 1 and 6, through an eighth brake;

Figure 24 is a section through the anchorage and the applying means, on the line 24—24 of Figure 23;

Figure 25 is a partial section through the joint between the shoes, on the line 25—25 of Figure 23;

Figure 26 is a partial elevation of the upper part of the brake, showing a different form of toggle;

Figure 27 is a similar view of another toggle;

Figure 28 is a partial vertical section, corresponding to the upper part of Figure 1, through a ninth brake;

Figure 29 is a section through the anchorage and the applying means, on the line 29—29 of Figure 28;

Figure 30 is a section corresponding to Figure 29, but showing a different anchorage;

Figure 31 is a partial section, corresponding to the lower part of Figure 1, but showing a different joint;

Figure 32 is a section through the joint on the line 32—32 of Figure 31;

Figure 33 is a partial section, corresponding to the upper part of Figure 1, but showing a different brake; and Figure 34 is a section through the anchorage and the applying means, on the line 34—34 of Figure 33.

Figure 17:
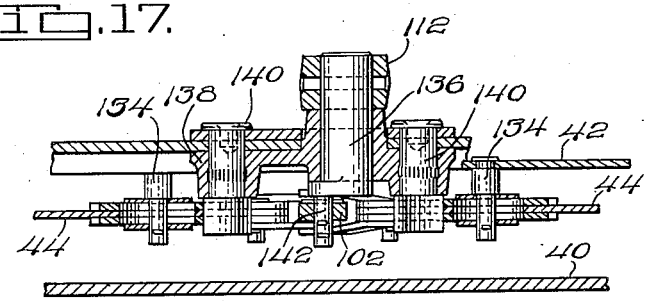
Figure 17 is a section through the anchorage and the applying means, on the line 17—17 of Figure 16.

Each of the various brakes includes a rotatable drum 40, at the open side of which is a stationary support such as a backing plate 42, and within which is arranged the friction means of the brake, preferably comprising novel floating articulated brake shoes 44. The friction means in each of the illustrated forms anchors at one end when the drum is turning in one direction and at the other end when the drum is turning in the other direction.

In the brake of Figures 1–5, the shoes 44 are formed with wedge surfaces at their adjacent ends, by welding or otherwise securing thereto on opposite sides of the stiffening web pressed steel stampings 46, or the like, having triangular-section portions forming the wedge surfaces. These surfaces are engaged by cooperating pressed-steel wedges 48, having conically-arranged cylindrical surfaces engaging members 46. One wedge 48 is engaged by the head of an adjusting bolt 50 passing between the shoe ends and through a spacer sleeve 52 engaging the other wedge. A nut 54 on bolt 50 can be tightened to draw wedges 48 toward each other to make the adjustment, and a locknut 56 may be provided to preserve the adjustment. Spacer sleeve 52 and bolt 50 pass through a relatively large opening 58 in the backing plate, so that the adjustment is made from outside the backing plate.

Steady pins 60 carried by the backing plate are slidably engaged by the brake shoes. The shoes are held against these pins by novel steady rests such as C-shaped leaf springs 62 secured at their ends to the backing plate and yieldingly engaging the sides of the brake shoes opposite the backing plate.

At the upper side of the brake, shoes 44 are provided with thrust plates 64 riveted or projection-welded to opposite sides of the shoe webs, and which are turned at right angles at the ends of the shoes to form thrust flanges disconnectedly engaging a novel anchor member shown as a hollow steel stamping 66 riveted to the backing plate. The brake is applied, against the resistance of a return spring 68, by means such as a novel toggle including links 70. Links 70 have their ends turned at right angles to be received in openings in an operating link 72 and in the ends of the shoes. Link 72 is pivotally mounted on a pin at the end of an arm 74 forged integrally of a brake-applying shaft 76. Shaft 76 is shown journaled in a flange 78 drawn integrally from the backing plate and in a steel stamping 80 having a bearing coaxial with respect to flange 78, and which is connected to the backing plate by part of the rivets holding the anchorage 66. Shaft 76 and the applying means operated thereby are partially housed within the anchor stamping 66.

The toggle 70 is held under tension by a centering wedge lever 82, pivoted on one of the pins 60 and having a double wedge surface embracing sleeve 52. Lever 82 is urged downwardly by a spring 84 looped around the pin 60 and connected at one end to the backing plate and having the other end hooked over the end of the lever.

It is important to note that the angle of toggle 70, and the strength of a spring 68, are such that when shaft 76 is turned the toggle first lifts the shoe assembly bodily against the resistance of spring 84, until the upper ends of the shoes engage the drum. The drum friction then holds one or the other of the shoes anchored against member 66, while the continued turning of the shaft spreads the toggle to complete the application of the brake. When the brake is released, spring 68 pulls both shoes against the anchor member 66 at the top of the brake, while lever 82 yieldingly centers the lower ends of the shoes. A suitable spring 88 (Figure 6) may, if desired, be tensioned between the lower ends of the shoes to hold them against the joint.

The brake of Figures 6–8 differs from that described above, in that centering lever 90, corresponding to lever 82, is operated by a tension coil spring 92 connected to the backing plate, and in that nut 94 on the bolt 50 is extended into direct thrust engagement with wedge 48.

In the arrangement of Figures 9–11, the shoes anchor against an abutment 96 riveted to the backing plate and extending between the upper ends of the shoes, which ends are reinforced by plates 98 projection-welded to opposite sides of the webs. The toggle in this case consists of two pairs of links 100 straddling and pivoted to the shoe ends, and also straddling and pivoted to a tension link 102 mounted on a pivot at the end of an arm 104 on a shaft 106 journaled in a bracket 108 welded to a plate 110 riveted to the backing plate. Plate 110 is shown as integral with abutment 96. An operating arm 112 is mounted on the end of the shaft. The toggle in this case also lifts the shoe assembly while both shoes are anchored, after which it is spread to complete the application of the brake while one shoe is held anchored by the drum friction.

In this arrangement, the joint consists of a right-and-left threaded member 114 threaded into semi-cylindrical thrust members 116 engaging the ends of the shoes. The member 114 extends loosely into sockets formed between stampings 118 projection-welded to the shoe webs, and is formed at its ends for interlocking engagement with rounded teeth on pawl washers 120 urged thereagainst by springs 122.

In the arrangement of Figures 12–15, the shoes are connected by a joint 124 described and claimed in my prior application No. 230,955, filed November 4, 1927, and the shoes are positioned by automatically-adjusted devices 126 described and claimed in my prior application No. 168,045, filed February 14, 1927. In this arrangement, the shoes anchor against hook-shaped fittings 128 riveted to the backing plate, and the shoe ends, reinforced by plates 130 welded thereto, extend past the anchor fittings 128 for connection to the toggle links 100. The arm 104' in this case consists of two stampings mounted on the flattened end of shaft 106. The shaft in this case is journaled in a bracket 132 secured to the backing plate. The ends of the shoes are positioned by steady-rest pins 134 carried by the backing plate and passing through relatively large openings in the shoe webs, and having pairs of washers engaging opposite sides of the shoe webs.

Figure 16:
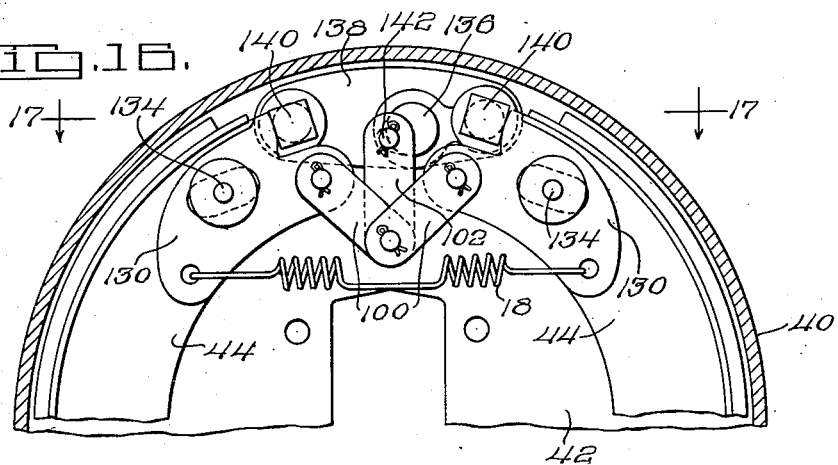
Figure 16 is a partial vertical section, corresponding to the upper part of Figures 1, 6, 9, and 12, but showing a fifth brake.

In Figures 16 and 17, the operating shaft 136 is journaled in a bracket 138 secured to the backing plate by anchor pins 140 having squared ends slidably engaged by the shoe ends. The tension link 102 of the toggle is here pivotally mounted on an eccentric pin 142 at the end of the shaft 136.

Figure 18:
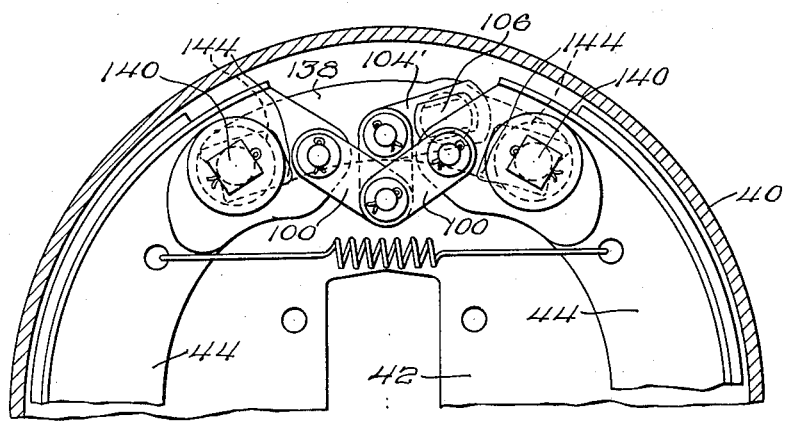
Figure 18 is a partial vertical section corresponding to Figure 16, but showing a sixth brake.

In Figure 18, the anchor pins 140 extend through openings or oblong slots 144 in the shoe webs, and the double-arm construction 104' is used.

In Figures 19–22, the shoes anchor in reverse braking on the operating shaft 146, which has an arm 148 with a pin on which is pivoted a tension link 150 formed at its lower end with sockets receiving the ends of toggle links 152 pivoted to the shoe ends. In forward braking, the shoes anchor against a fitting 154 which also serves as a rivet to secure to the backing plate a bracket 156 in which shaft 146 is journaled. A plate 158 attached to the end of fitting 154 serves to hold the shoe ends laterally.

One shoe 44 in this arrangement is held by a suitable steady rest 160, while the other is held by a spring 162 in the position determined by one of the automatic positioning devices 126. As shown in Figure 21, this device includes a plate 164 frictionally clamped at one end by a bolt 166 to the shoe web. At its other end plate 164 has a slot slightly wider than a pin 168 carried by the backing plate and passing through the slot, thus giving a clearance equal to the desired release movement of the shoe.

The joint between the shoes here consists of the above-described right-and-left threaded member 114. A stamping 170, of general U-shaped section riveted to the backing plate, has a part engaging the ends of thrust members 116 opposite the backing plate.

In Figures 23–25, the shoes 172 are generally L-shaped in section, with the stiffening web adjacent the backing plate, although preferably stiffened by an inner short flange 174. The shoes are held against the backing plate by steady rests 176 and by leaf springs 178 carried by the backing plate. A spring 180 holds the shoes when released in a position determined by one of the automatic shoe-positioning devices 126. The joint between the shoe consists of two thrust members 182 and 184 threaded into nuts 186 held by stampings 188 embracing the nuts and secured at their ends to the shoe webs. Thrust member 182 has a rounded head held in a socket in member 184 by a leaf spring 190. A sleeve 192 embracing the heads of members 182 and 184 holds them in alinement.

This brake is applied, as described above, by a toggle 194 consisting of links received at their ends in sockets formed in the ends of the shoes, and in sockets formed in the sides of a tension link 196 pivoted at the end of an arm 198 on an operating shaft 200. Shaft 200 is journaled in a bearing 202 secured to the backing plate and serving as an anchor for one of the shoes 172. A fitting 204 secured to the backing plate serves as an anchor for the other shoe 172.

As shown in Figure 26, the tension link 196 may be replaced by a member 206 formed from strip steel welded into a continuous length with a looped portion pivoted on arm 198, and with sockets for links 194. In Figure 27 the tension link is a member 208 formed of strip steel with its ends looped around to form sockets for the toggle links.

The arrangement of Figures 28 and 29 is much like that of Figure 1, except that the shoe ends have reinforcing plates 210 at their ends which are flanged in opposite directions for engagement with the anchor member 66. In Figure 30, the anchor stamping 212, corresponding to stamping 66, has a reversely-drawn portion with a flange 214 forming a bearing for shaft 76.

In Figures 31 and 32, the right-and-left threaded member is formed by welding together two drawn steel members 216, and is used to connect two of the L-section shoes 172, which have curved flanges 218 at their ends against which the thrust members 116 may seat. A pawl lever 220, urged downwardly by a spring 222, has a pointed projection entering an opening in one member 216, and yieldingly preventing said members from turning.

In Figures 33 and 34, an operating shaft 224, having an arm 226 pivotally connected to a tension link 228, is journaled in three coaxial bearings formed respectively in an outer stamping 230 secured to the backing plate, in the backing plate itself, and in an inner stamping 232 also secured to the backing plate. In this case the plates 210 of the shoes anchor against the backing plate itself at one side of the shoes, and against stamping 232 at the other side of the shoes. To permit this the backing plate is drawn or embossed to form an anchor projection 234.

While several illustrative embodiments have been described in detail, it is not my intention to limit the scope of the invention to those particular embodiments, or otherwise than by the terms of the appended claims. Some of the constructions described above are claimed in my divisional applications Nos. 624,083, filed July 22, 1932, 691,579, filed September 30, 1933, and 692,235, filed October 5, 1933.

What I claim is:

1. A brake comprising, in combination, a drum, a plurality of articulated floating shoes within the drum having separable ends and arranged to anchor on one shoe when the drum is turning in one direction and to anchor on the other shoe when the drum is turning in the other direction, and a toggle arranged to raise the shoe assembly bodily while both shoes are anchored to bring at least one of the separable ends of one shoe against the drum to cause the drum friction to hold one or the other of the shoes anchored, and then to force the shoes apart to complete the application of the brake.

2. A brake comprising, in combination, a drum, a plurality of articulated floating shoes within the drum and arranged to anchor on the free end of one shoe when the drum is turning in one direction and to anchor on the free end of the other shoe when the drum is turning in the other direction, and a toggle connected to said ends and arranged to move the shoe assembly bodily while said ends of both shoes are anchored to bring the portions of said shoes adjacent said ends against the drum to cause the drum friction to hold one or the other of the shoes anchored, and then to force the shoes apart to complete the application of the brake.

3. A brake comprising, in combination, a drum, a floating friction device within the drum having separable ends, a shaft extending between said ends and having an arm at its end, a toggle linked to said arm and connected to said ends, and a hollow member at least partially enclosing the shaft and arm and serving as a stationary anchor engaged by said ends.

4. A brake comprising, in combination, a drum, a backing plate, a floating friction device within the drum having separable ends, means cooperating with said ends and arranged to force them apart to apply the brake, and a projecting stamping having a base flange secured to the backing plate and at least partially enclosing said means and serving as a stationary anchor engaged by said ends.

5. Brake-applying means comprising, in combination, a shaft having an arm, a link on said arm having two openings at its end, and two toggle links having ends turned at right angles and inserted in said openings and having their other ends turned at right angles for pivotal engagement with brake friction means.

6. A brake comprising, in combination, a backing plate, a floating friction device adjacent the backing plate, a bracket having spaced fastenings securing it to the backing plate and having projecting portions engaged by the friction device and serving as anchors for the friction device, and applying means supported by the bracket.

7. A brake comprising, in combination, a bracket, a backing plate, an anchor member securing the bracket to the backing plate, and an operating shaft journaled in the bracket and also serving as an anchor member.

8. A brake anchor member comprising a drawn steel stamping having a reversely-drawn portion serving as a shaft bearing.

9. A brake comprising an operating means including a vertically extending link having hooked ends to provide a recess on either side of said link, together with thrust links, each having a rounded end fitting within one of said recesses.

10. A brake anchorage and applying mechanism comprising, in combination with brake friction means, an applying device and a pair of brake anchors arranged respectively on opposite sides of the applying device and having substantially flat anchor faces on the sides away from said device adapted for slidable anchoring engagement with the brake friction means, said means having webs formed with generally radial surfaces extending across the thickness thereof and slidably engaging said anchors.

11. A brake comprising a drum, a pair of spaced anchors having oppositely-facing generally radial surfaces, and friction means having stiffening webs formed with radial surfaces extending across the thickness thereof and slidably anchoring against one of said surfaces when the drum is turning in one direction and slidably anchoring against the other of said surfaces when the drum is turning in the other direction.

12. A brake comprising a drum, a pair of spaced anchors having oppositely-facing generally radial surfaces, and articulated shoes having stiffening webs formed with radially-arranged surfaces extending across said webs and one of which slidably anchors against one of said surfaces when the drum is turning in one direction and the other of which slidably anchors against the other of said surfaces when the drum is turning in the other direction.

LUDGER E. LA BRIE.